United States Patent
Itakura et al.

(10) Patent No.: US 8,300,341 B2
(45) Date of Patent: Oct. 30, 2012

(54) MAGNETIC RECORDING DEVICE, MAGNETIC RECORDING METHOD, AND MAGNETIC STORAGE MEDIUM

(75) Inventors: Akihiro Itakura, Akishima (JP);
Masatoshi Sakurai, Tokyo (JP);
Kazuhito Shimomura, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 49 days.

(21) Appl. No.: 13/043,883

(22) Filed: Mar. 9, 2011

(65) Prior Publication Data
US 2011/0222186 A1    Sep. 15, 2011

(30) Foreign Application Priority Data
Mar. 12, 2010   (JP) .................................. 2010-056383

(51) Int. Cl.
*G11B 5/02*    (2006.01)
(52) U.S. Cl. .................... 360/48; 360/75; 360/78.04
(58) Field of Classification Search .................... None
See application file for complete search history.

(56) References Cited

U.S. PATENT DOCUMENTS

| | | | | |
|---|---|---|---|---|
| 6,826,140 B2 * | 11/2004 | Brommer et al. | ............... | 369/94 |
| 7,706,092 B2 * | 4/2010 | Ling et al. | ....................... | 360/48 |
| 7,782,561 B2 * | 8/2010 | Albrecht et al. | ............... | 360/48 |
| 7,965,465 B2 * | 6/2011 | Sanvido et al. | ................. | 360/60 |
| 8,040,629 B2 * | 10/2011 | Gao | ................................. | 360/48 |
| 2007/0258161 A1 | 11/2007 | Richter et al. | | |

FOREIGN PATENT DOCUMENTS

| | | |
|---|---|---|
| JP | 2001-243719 | 9/2001 |
| JP | 2003-151103 | 5/2003 |
| JP | 2003-303401 | 10/2003 |
| JP | 2007-073116 | 3/2007 |
| JP | 2007-305289 | 11/2007 |

OTHER PUBLICATIONS

Notice of Reasons for Rejection mailed by the Japan Patent Office on Jun. 7, 2011 in corresponding Japanese patent app. No. 2010-056383 in 7 pages.

* cited by examiner

*Primary Examiner* — Hoa T Nguyen
*Assistant Examiner* — James L Habermehl
(74) *Attorney, Agent, or Firm* — Knobbe, Martens, Olson, and Bear, LLP

(57) ABSTRACT

According to one embodiment, a magnetic recording device based on shingled-write recording method comprises a magnetic storage medium, a recording head, and an actuator. The magnetic storage medium comprises dot rows wherein a phase shift is between adjacent rows. The recording head covers a predetermined number of dot rows of the magnetic storage medium and comprises an edge at one of the dot rows. The actuator configured to move a recording head by an amount equivalent to a dot row after recording is performed on one of the dot rows by the recording head.

8 Claims, 5 Drawing Sheets

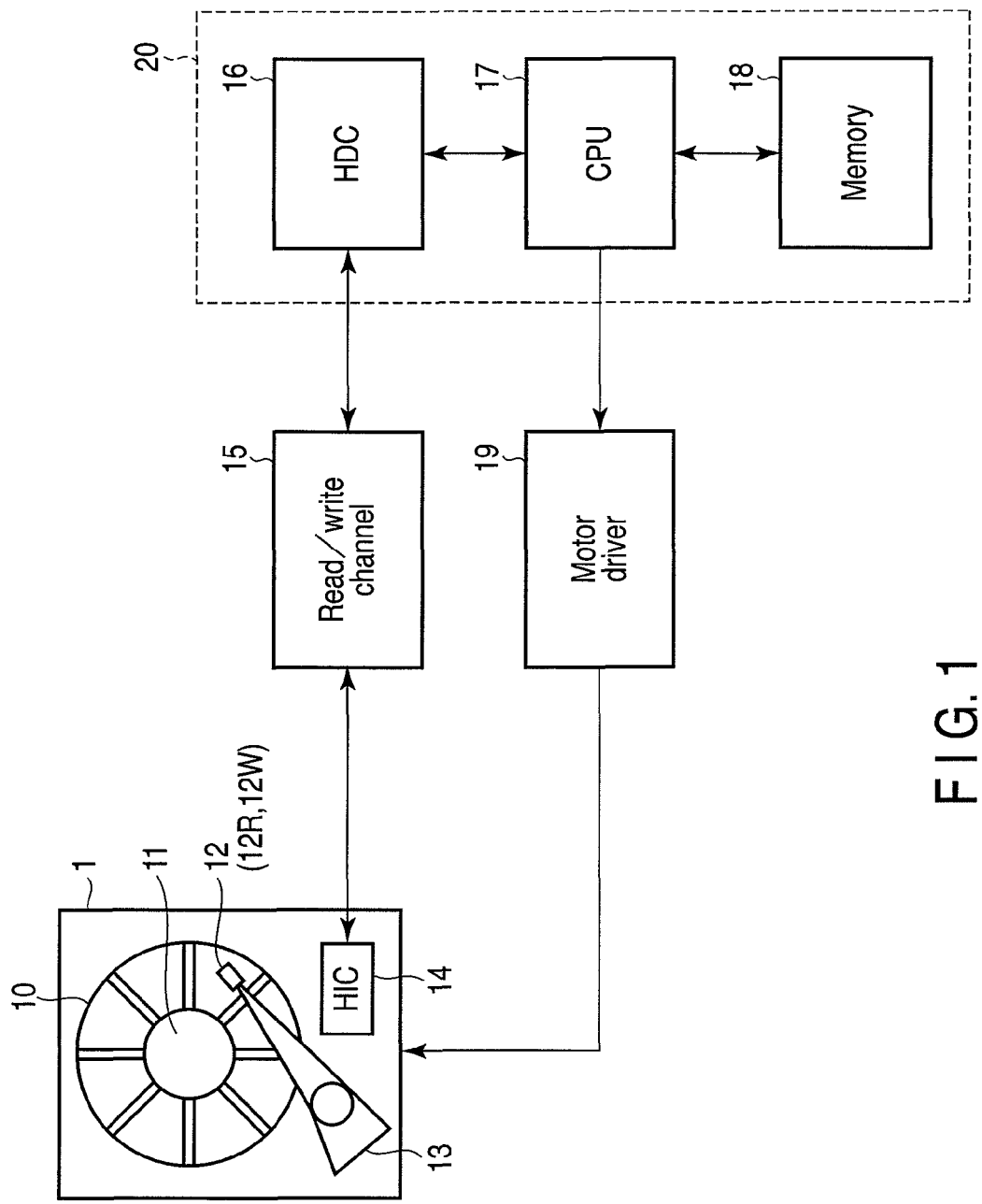
F I G. 1

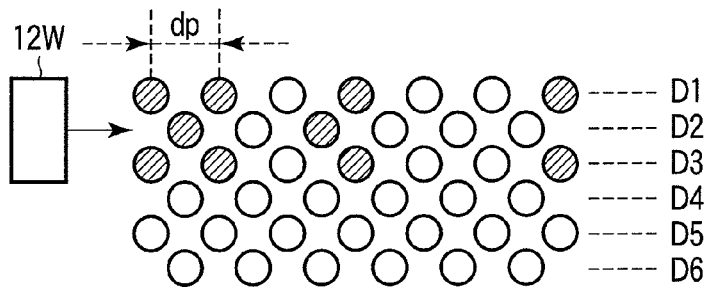
F I G. 2A
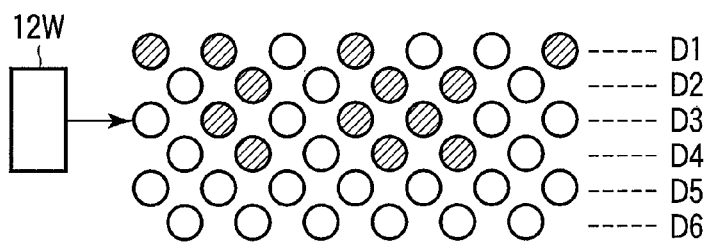
F I G. 2B
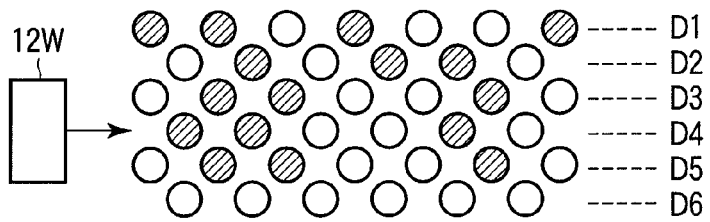
F I G. 2C
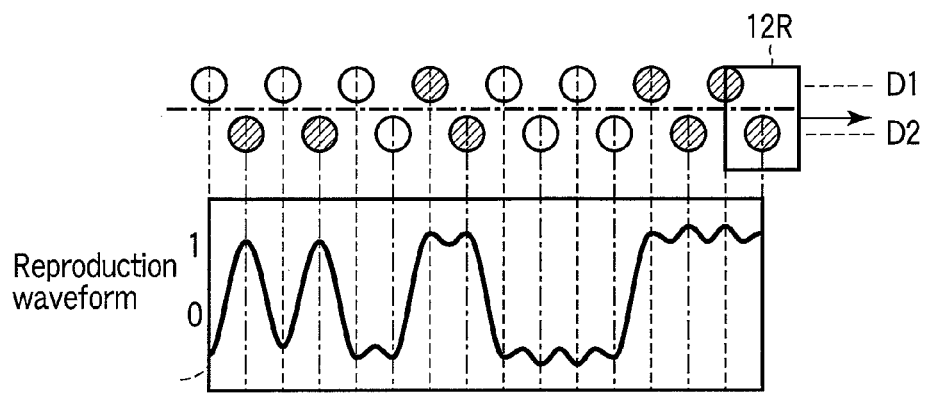
F I G. 3

MAGNETIC RECORDING DEVICE, MAGNETIC RECORDING METHOD, AND MAGNETIC STORAGE MEDIUM

CROSS-REFERENCE TO RELATED APPLICATIONS

This application is based upon and claims the benefit of priority from Japanese Patent Application No. 2010-056383, filed Mar. 12, 2010; the entire contents of which are incorporated herein by reference.

FIELD

Embodiments described herein relate generally to a magnetic recording device, a magnetic recording method, and a magnetic storage medium.

BACKGROUND

As information devices such as personal computers and hard disc recorders have come to achieve high function and high speed, amounts of information handled by users have accordingly more and more increased in recent years. Therefore, storage media for information recording devices are demanded to have higher recording density. To increase recording density, it is necessary to miniaturize the size of each recording cell or recording mark which is a recording writing unit in recording media. However, miniaturization of recording cells or marks in conventional storage media has encountered great difficulties.

Storage media for existing hard disc devices have a structure in which a granular thin film having a thickness of 10 nm or so is deposited on a disc substrate. If grains of the granular thin film are formed to be small to improve recording density, polycrystal causes instable recording due to thermal fluctuation (specifically, as a volume of magnetic grains decreases, a ratio of magnetic energy to thermal energy decreases, and magnetization in recording varies or ceases under influence of temperature). Therefore, recording becomes instable or noise increases when recording cells are small, while no problem occurs when recording cells are large. This is caused by decrease in number of crystal grains included in recording cells and by relative increase of interaction between recording cells each other.

To avoid this problem, as next-generation magnetic storage media which will take over thin-film media, there have been proposed bit-patterned media (BPM) in which a recording material is divided in advance by a non-recording material and recording/reproducing is performed, considering one single grain of the recording material as one unit recording cell (for example, see Jpn. Pat. Appln. KOKAI Publication No. 2007-73116 (paragraphs 0024 to 0027), Jpn. Pat. Appln. KOKAI Publication No. 2007-305289 (paragraphs 0012 to 0020), and Jpn. Pat. Appln. KOKAI Publication No. 2003-151103 (paragraphs 0025 to 0026)).

The bit-patterned media each are configured to employ a magnetic dot array in which nanometer-scale micro magnets (magnetic dots) are regularly arrayed on a substrate. Digital signals "0" and "1" (where each one dot corresponds to one bit) are recorded as magnetization directions of each magnetic dot. In the bit-patterned media, each bit is absolutely physically independent, and therefore, noise is not caused in principle by magnetization transition as a major factor which hinders improvement to attain higher recording density in continuous film media.

On the other side, a writing position may shift off in a track direction because a timing to start writing shifts when a recording head records data at a particular position on a storage medium for existing hard disc devices in which a granular thin film is deposited. Even then, write errors hardly occur because the medium has a uniform surface.

However, in bit-patterned media in which a recording material is divided by a non-recording material on a surface of a storage medium, matching of a timing to start recording is significant because it is necessary to write data into every one of divided recording cells when a recording head records data at a particular position on a storage medium. If the timing to start writing shifts off, the recording head performs a writing operation, spreading over a part of a non-recording material or an adjacent recording cell. Therefore, write errors increase.

Array patterns for the bit-patterned media may be grid (square) patterns and staggered patterns. In a grid pattern in which dots are arrayed vertically and horizontally as disclosed in the foregoing Publication No. 2007-73116, each one dot row is considered as one track, and therefore, accuracy is required for constraint conditions concerning a cross-track direction, such as a head core width and tracking.

As solutions thereof, staggered patterns as described in the foregoing Publications No. 2007-305289 and No. 2003-151103 have been discussed. In such staggered patterns, a large number of dot rows are arrayed at a constant dot pitch, and odd-numbered dot rows thereof and even-numbered dot rows thereof are shifted from each other by 180 degrees in phase. A head has a width capable of simultaneously accessing two dot rows. During recording, writing is performed in an order of a first dot in a first row, a first dot in a second row, a second dot in the first row, ..., while moving the head along the dot rows. Similarly, during reproduction, reading is performed in an order of the first dot in the first row, the first dot in the second row, the second dot in the first row, ..., while moving a head along the dot rows. Thus, adjacent two dot rows are used as one data track. Accordingly, the staggered patterns have a double track pitch and a half bit pitch, compared with the grid patterns. A factor which decides a write phase margin is a space between dots (a dot pitch). However, the staggered patterns use two dot rows as one data track, and therefore, have a half dot pitch. Consequently, the staggered patterns have a smaller write phase margin than the grid patterns. Therefore, stricter accuracy is required for manufacturing discs and heads for the staggered patterns.

Thus, in magnetic recording devices using conventional bit-patterned media, the write phase margin is narrow and therefore causes a drawback of easy occurrence of write errors. To prevent the drawback, higher processing accuracy in manufacture is required strictly.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view illustrating a magnetic recording device according to a first embodiment.

FIGS. 2A, 2B, and 2C are exemplary views illustrating states of shingled-write recording according to the first embodiment.

FIG. 3 is an exemplary view illustrating a state of reproduction according to the first embodiment.

DETAILED DESCRIPTION

Figure 4:
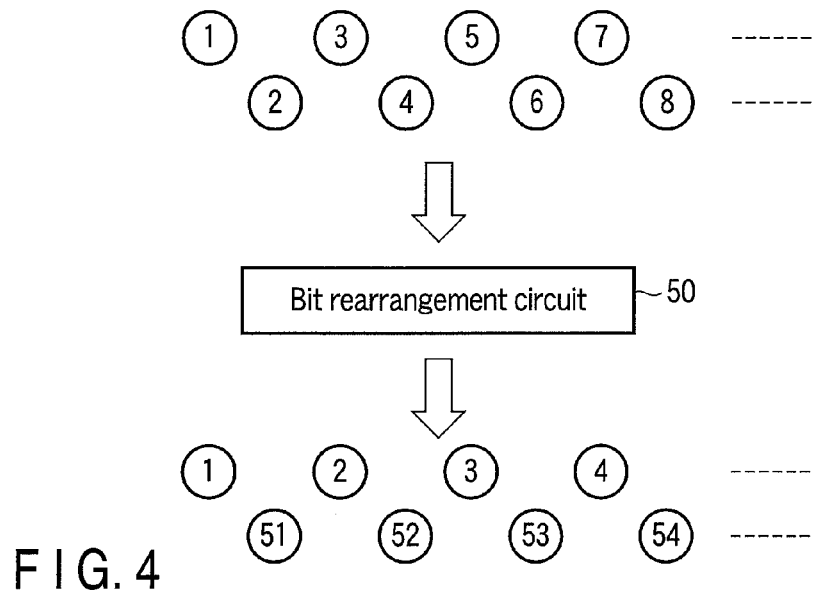
FIG. 4 is an exemplary view illustrating a state of rearranging bits during reproduction according to the first embodiment.

Various embodiments will be described hereinafter with reference to the accompanying drawings. In general, according to one embodiment, a magnetic recording device based on shingled-write recording method comprises a magnetic storage medium, a recording head, and an actuator. The magnetic storage medium comprises dot rows with a phase shift between adjacent rows. The recording head covers a predetermined number of dot rows of the magnetic storage medium and comprises an edge at one of the dot rows. The actuator moves a recording head by an amount equivalent to a dot row after recording is performed on one of the dot rows by the recording head.

FIG. 1 is a block diagram for describing a configuration of a magnetic recording device and a magnetic recording method according to a first embodiment.

A disc drive 1 comprises a disc 10 as a magnetic storage medium, a spindle motor (SPM) 11 which rotates the disc 10, a head 12, an actuator 13, and a head amplifier unit (head IC: HIC) 14. The disc 10 is a bit-patterned medium constituted by a magnetic dot array in which nanometer-scale micro magnets (magnetic dots) are regularly arrayed on a substrate, and digital signals "0" and "1" (where one dot corresponds to one bit) are recorded as magnetization directions of each magnetic dot.

The head 12 has a structure in which a read head element 12R and a write head element 12W are mounted on one slider, separated from each other. The read head element 12R reads data recorded on the disc 10. The write head element 12W writes data onto the disc 10. The actuator 13 comprises a suspension, an arm, and a voice coil motor (VCM), with the head 12 mounted on the suspension. The actuator 13 moves the head 12 in radial directions (cross-track directions) of the disc 10 to control tracking.

The head amplifier unit 14 comprises a read amplifier which amplifies a read signal read by the read head element 12R of the head 12 and outputs the amplified signal to a read/write channel 15. The head amplifier unit 14 also converts write data, which is output from the read/write channel 15, into a write signal (a write current), and supplies the write signal to the write head element 12W of the head 12.

The disc drive 1 comprises a read/write channel 15 mounted on a printed circuit board, a hard disc controller (HDC) 16, a micro processor (CPU) 17, a memory 18, and a motor driver 19. The HDC 16, CPU 17, and memory 18 are mounted on a one-chip integrated circuit 20.

The read/write channel 15 is a signal processing unit which processes a read/write signal. The HDC 16 constitutes an interface between the disc drive 1 and an unillustrated host system (a personal computer or a digital device), and controls data transfer and read/write operations. The CPU 17 is a main controller for the disc drive 1, and performs a head positioning control (a servo control) and rearrangement of the read data and/or write data. The memory 18 is a flash EEPROM, for example.

The motor driver 19 comprises a VCM driver which supplies the SPM 11 with a drive current and also supplies the VCM of the actuator 13 with a drive current. The VCM driver supplies the VCM of the actuator 13 with a drive current in accordance with the head positioning control of the CPU 17, to control the head 12 so as to move in radial directions of the disc 10.

A recording method according to the first embodiment will now be described with reference to FIGS. 2A, 2B, and 2C. As described above, the disc 10 is a bit-patterned medium, and magnetic dots are arrayed in a staggered pattern, as illustrated in FIGS. 2A, 2B, and 2C. Odd-numbered dot rows D1, D3, and D5 and even-numbered dot rows D2, D4, and D6 are shifted in phase by 180 degrees from each other. That is, each of dots in odd-numbered dot rows is positioned between two adjacent dots in even-numbered dot rows. An array direction (a row direction) of dots is a track direction (a circumferential direction of the disc). In the present embodiment, one dot row constitutes one track.

The write head element 12W has a width capable of simultaneously accessing plural dot rows, such as three dot rows. Write data output from the read/write channel 15 is converted into a write signal (a write current) by the head amplifier unit 14, and is supplied to the write head element 12W. Bits of the write data are written into the dots, respectively.

FIG. 2A illustrates a state of writing into a first dot row D1. During writing into the first dot row D1, the actuator 13 controls a position of the write head element 12W in a manner that a rear end (edge) of the write head element 12W in a cross-track direction covers the first dot row D1. Writing using thus the edge of the write head element 12W is called "edge writing". Where black circles each represent 1 and white circles each express 0, data of 1101001 . . . is written in the first dot row D1. Since the write head element 12W has a width capable of simultaneously accessing three dot rows, the same data as above is written into second and third dot rows D2 and D3. However, the present embodiment employs a shingled-write recording method for recording on one after another of dot rows in a manner that overwriting is performed after a write head element is moved by one dot row each time recording into one dot row is completed. Therefore, no problem occurs even if data is written even into dot rows other than a desired dot row.

After writing into the first dot row D1, the actuator 13 performs a tracking control so as to move the write head element 12W by one dot row in the cross-track direction of the write head element 12W, as illustrated in FIG. 2B, such that the rear end (edge) of the write head element 12W in the cross-track direction covers the second dot row D2. At this time, a write phase is shifted by a ½ dot pitch (equivalent to a phase angle of 180 degrees) so as to match the phases of dots. In this manner, 010110 . . . is written into the second, third, and fourth dot rows D2, D3, and D4. Accordingly, data which has been written into the second dot line D2 by previous writing into the first dot row D1 as illustrated in FIG. 2A is overwritten with originally intended write data. After writing into the second dot line D2, the actuator 13 performs a tracking control so as to further move the write head element 12W by one dot row in the cross-track direction as illustrated in FIG. 2C, such that the rear end (edge) of the write head element 12W in the cross-track direction covers the third dot row D3. In this manner, data of 0110010 . . . is written into the third, fourth, and fifth dot rows D3, D4, and D5. Accordingly, data which has been written into the third dot line D3 by previous writing into the second dot row D2 as illustrated in FIG. 2B is overwritten with originally intended write data.

In the same manner as above, each time writing is thereafter performed by the write head element 12W, the write head element 12W is then moved by one dot, and shingled-write recording is performed, overwriting previously written data with originally intended data. Accordingly, data is written, row by row. A write phase margin at this time depends on a dot pitch dp.

In simultaneous writing into two rows in a bit-patterned medium as disclosed in the foregoing Publication No. 2007-305289 or 2003-151103, the bit pitch is half of dp. Comparatively, the dot pitch according to the present embodiment is twice greater, and the write phase margin is also twice greater. Therefore, accuracy of the magnetic dot array of the bit-patterned medium 10 and accuracy of the width of the write head element 12W (in the cross-track direction) can be relaxed.

Next, a reproduction method according to the first embodiment will be described with reference to FIG. 3. During recording, the write head element 12W is subjected to a tracking control in a manner that the rear end (edge) in the cross-track direction covers a dot row, as illustrated in FIGS. 2A, 2B, and 2C. However, the read head element 12R has a width capable of simultaneously accessing plural dot rows, such as two dot rows, as illustrated in FIG. 3. During reproduction, the read head element 12R is subjected to a tracking control in a manner that a center thereof in width directions is positioned at a center of two adjacent dot rows. Since each two adjacent dot rows are shifted in phase by 180 degrees from each other, data can be read alternately from two dot rows by the read head element 12R having a width capable of simultaneously accessing two dot rows. Where 00010011 . . . is recorded in the first dot row D1 as well as 11010011 . . . in the second dot row D2, reproduced data is 0101001100001111 . . . .

During recording, data is written for each dot rows. During reproduction, data is read alternately from two dot rows. Therefore, it is necessary to rearrange an order of bits of data between recording and reproduction. As illustrated in FIG. 4, the CPU 17 buffers bit sequences of reproduced data which are read alternately from two dot rows, into a bit rearrangement circuit 50. The CPU 17 firstly outputs the bit sequence reproduced from the first dot row, and thereafter outputs the bit sequence reproduced from the second dot row. In this manner, recorded data can be reproduced properly. Numerals in circles in FIG. 4 express order numbers of bits. Alternatively, an order of bits of data may be rearranged during recording, and the recorded bits of data then may be output directly in the rearranged the order.

As has been described above, the present embodiment employs the shingled-write recording method. That is, edge writing is performed on the bit-patterned medium 10 constituted by a dot array having a staggered pattern in which adjacent dot rows are shifted in phase by 180 degrees from each other, with use of the write head element 12W having a width capable of simultaneously accessing plural dot rows. Each time recording is completed on one track (one dot row), the write head element 12W is then moved by one dot row in the cross-track direction, and recording is further performed by overwriting, thus to sequentially achieve recording, tack by track. Therefore, the dot pitch is twice greater and the write phase margin is also twice greater, compared with a case that recording is performed on a bit-patterned medium 10 constituted by a dot array having a staggered pattern, taking two dot rows as one track. Accordingly, accuracy of the array of magnetic dots of the bit-patterned medium, and accuracy of the width of the write head element 12W (in the cross-track direction) can be relaxed.

Hereinafter, another embodiment of a magnetic recording device will be described. In descriptions made below of the another embodiment, the same parts as those in the first embodiment will be denoted at the same reference numerals, and detailed descriptions thereof will be omitted herefrom.

The same block diagram as referred to in the first embodiment directly applies to the second embodiment, and therefore, no block diagram is provided especially for the second embodiment.

Figure 5A:
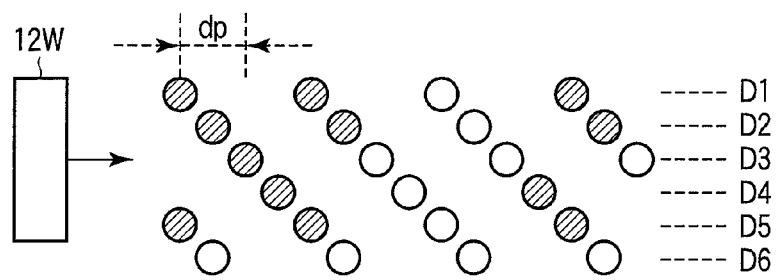
FIGS. 5A, 5B, and 5C are exemplary views illustrating states of shingled-write recording according to a second embodiment.
Figure 5B:
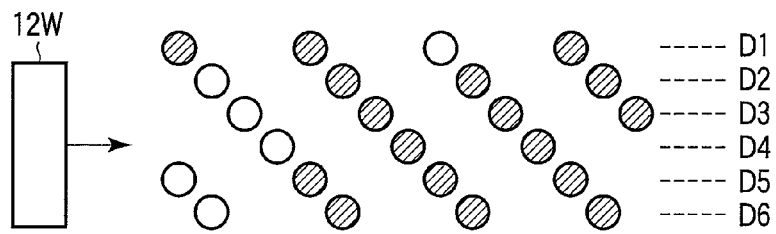
Figure 5C:
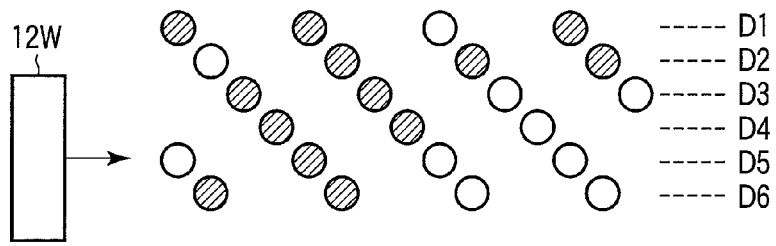

A recording method according to the second embodiment will be described with reference to FIGS. 5A, 5B, and 5C. As described above, a disc 10 is a bit-patterned medium, and an array of magnetic dots is patterned in a manner that phases of dots are shifted between dot rows, as illustrated in FIGS. 5A, 5B, and 5C. Here, each two adjacent dot rows are shifted in phase by 90 degrees from each other. Specifically, between two adjacent dots in a first row, dots in second, third and fourth rows are inserted. That is, the dot pattern according to the second embodiment is configured by increasing the space between two adjacent dots in a dot row from the dot pattern according to the first embodiment. However, a phase shift between each adjacent two dot rows is not limited to 90 degrees but need only be smaller than 180 degrees. For example, when dots in second and third rows are inserted between each two adjacent dots in a first dot row, the phase shift is 120 degrees. Alternatively, when dots in second, third, fourth, and fifth rows are inserted between each two adjacent dots in a first row, the phase shift is 72 degrees.

A write head element 12W has a width capable of simultaneously accessing plural dot rows which are greater in number than four, such as five dot rows.

FIG. 5A illustrates writing into a first dot row D1. During writing into the first dot row D1, an actuator 13 performs a tracking control in a manner that a rear end (edge) of the write head element 12W in a cross-track direction covers the first dot row D1. 1101 . . . is written into the first dot row. However, the same data as written is also written into dot rows up to a fifth dot row D5 because the write head element 12W has a width capable of simultaneously accessing five dot rows.

After writing into the first dot row D1, the actuator 13 performs a tracking control so as to move the write head element 12W by one dot row in the cross-track direction, as illustrated in FIG. 5B in a manner that the rear end (edge) of the write head element 12W in the cross-track direction covers a second dot row D2. At this time, a write phase is shifted by a quarter dot pitch (equivalent to a phase angle of 90 degrees) so as to match the dot rows. In this manner, 0111 . . . is written into dot rows from the second dot row D2 to a sixth dot row D6.

After writing into the second dot row D2, the actuator 13 performs a tracking control so as to move the write head element 12W by one dot row in the cross-track direction, as illustrated in FIG. 5C in a manner that the rear end (edge) of the write head element 12W in the cross-track direction covers a third dot row D3. In this manner, 1100 . . . is written into dot rows from the third dot row D3 to a seventh dot row.

In the same manner as above, each time writing is thereafter performed by the write head element 12W, the write head element 12W is then moved by one dot row, and shingled-write recording is performed to overwrite previously written data with originally intended data. Accordingly, data is written, dot row by dot row. A dot pitch dp of the second embodiment is twice greater than that of the first embodiment (or four times greater than that of simultaneous writing into two rows in a conventional bit-patterned medium having a staggered pattern). Accordingly, a write phase margin can be much greater.

Figure 6:
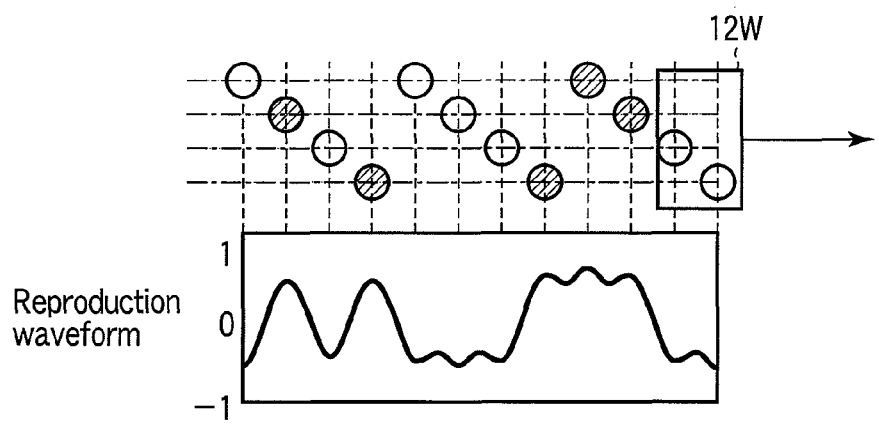
FIG. 6 is an exemplary view illustrating a state of reproduction according to the second embodiment.

Next, a reproducing method according to the second embodiment will be described with reference to FIG. 6. A read head element 12R has a width capable of simultaneously accessing plural dot rows as illustrated in FIG. 6, such as four dot rows, and is subjected to a tracking control to position a center of the width at a center of the second and third dot rows. Since each adjacent dot rows of the four dot rows are shifted in phase by 90 degrees from each other, data can be read sequentially from the four dot rows. Where 001 . . . is recorded on a first dot row D1, 101 . . . is recorded on a second dot row D2, 000 . . . is recorded on a third dot row D3, and 110 . . . is recorded on a fourth dot row D4, reproduced data is 010100011100 . . . .

Figure 7:
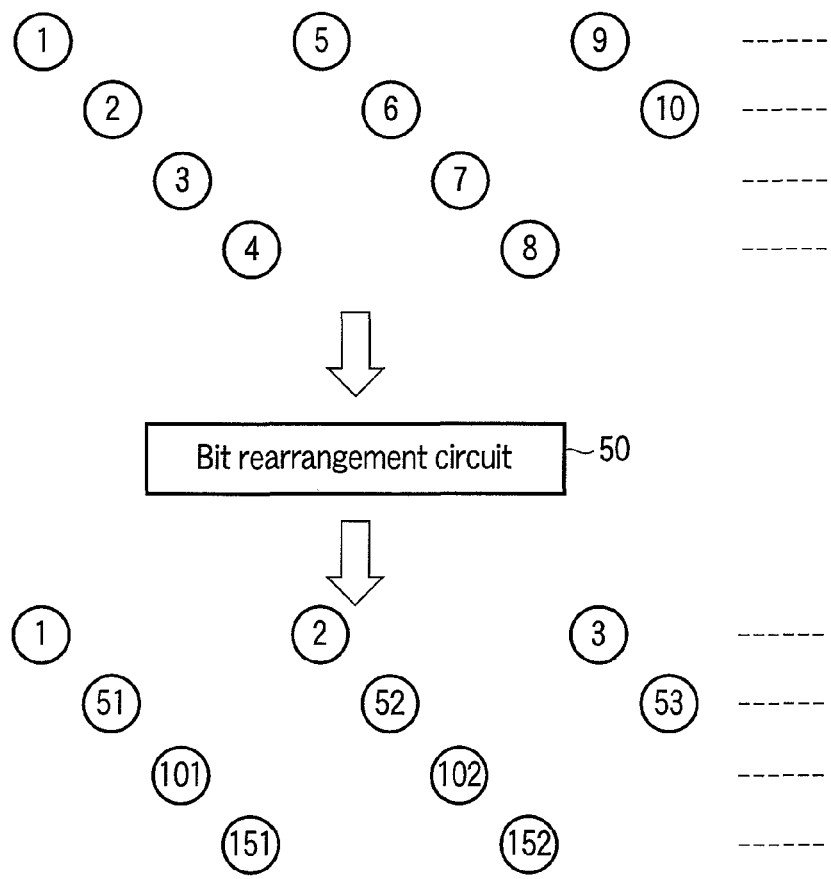
FIG. 7 is an exemplary view illustrating a state of rearranging bits during reproduction according to a third embodiment.

FIG. 7 illustrates a state of rearranging reproduced data by a bit rearrangement circuit 50, according to the second embodiment.

Also in the second embodiment, the dot pitch can be increased, and the write phase margin can be increased.

Figure 8:
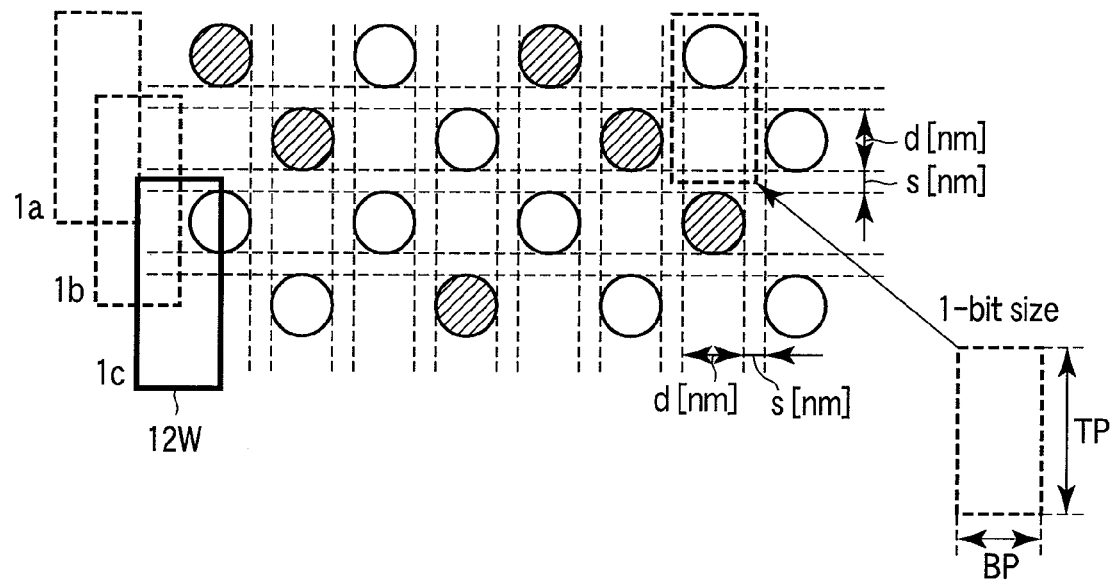
FIG. 8 is an exemplary view illustrating a write margin in the first embodiment.

Next, effects of the embodiments will be described with reference to a specific design example. FIG. 8 is an enlarged view of the dot array pattern of the bit-patterned medium according to the first embodiment illustrated in FIGS. 2A, 2B, and 2C. Dots each have a circular shape, and have equal sizes "d" (nm) in both the track direction and cross-track direction. A space "s" (nm) is maintained between dots, and each one bit has a size BP (nm) in the track direction and a size TP (nm) in the cross-track direction.

A recording density is supposed to be 2 tera bpsi (bit/inch-square). In simultaneous writing into two rows in a conventional bit-patterned medium having a staggered pattern as disclosed in the foregoing Publication No. 2007-305289 or 2003-151103, the dot size d=12.5 nm and the space s between dots=0.5 nm are set in order to achieve the recording density of 2 tera bpsi. At this time, the bit pitch BP=13 nm, and the track pitch TP=26 nm are given. Supposing a 2.5-inch size drive at 7,200 rpm, a minimum bit period is 570 psec (a distance equivalent to 13 nm). Where a write margin is ±10%, the write margin is ±57 psecs.

In the first embodiment, the dot pitch BP is substantially doubled, where the same recording density, dot sizes, and space as above are employed. The write margin can accordingly be twice relaxed to ±114 ps.

Figure 9:
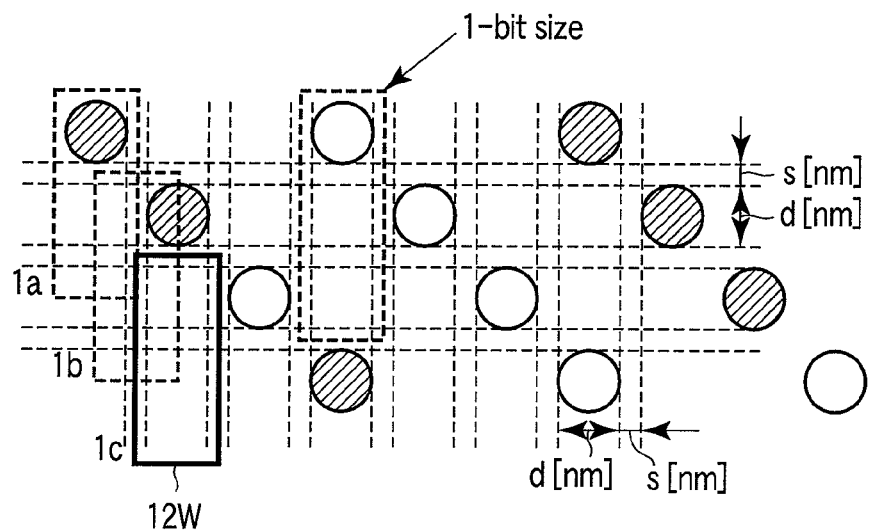
FIG. 9 is an exemplary view illustrating a write margin in the second embodiment.

FIG. 9 is an enlarged view of the dot array pattern of the bit-patterned medium according to the second embodiment. In the second embodiment as illustrated in FIGS. 5A, 5B, and 5C, three dots are inserted between each adjacent two dots in one row. However, for convenience of descriptions, two dots are inserted between each adjacent two dots in one row in FIG. 9. That is, an example is illustrated in which each adjacent dot rows are shifted in phase by 120 degrees from each other. Supposing the same recording density (2 Tbpsi) as in the first embodiment, it is necessary to reduce the dot size by an amount equivalent to an increase of the space between dots because plural dots are inserted between two adjacent dots in one dot row. Here, the dot size is reduced by 20% and d=10 nm is given. The space between dots is increased by an amount equivalent to sizes of two dots. Therefore, the bit pitch BP=31.5 nm is obtained, and processing accuracy can be relaxed. Accordingly, even if the recording density is increased to be higher, a load which the bit-patterned medium applies to the manufacturing process is small, and storage media having a higher recording density can be manufactured at an excellent yield.

Where the write phase margin at this time is set to ±10% which is the same as in the first embodiment, a write phase margin for one dot decreases to be as small as ±46 psec due to reduction of the dot size. However, since a space of two dots is maintained between each adjacent two dots in one row, a write margin of ±460 psec is added by the two dots. Accordingly, a write phase margin of a total ±506 ps can be maintained.

As has been describe above, the write phase margin can be increased because the shingled-write recording method is employed in the bit-patterned medium having a staggered layout. In a staggered layout in which each adjacent dot rows are shifted in phase by 180 (360/2) degrees from each other, the write phase margin can be increased to be twice greater. In a staggered pattern layout in which each adjacent dot rows are shifted in phase by 90 (360/4) degrees from each other, the write phase margin can be increased to be four times greater. Due to such increase of the write phase margin, processing accuracy required for the dot pattern in the bit-patterned media and accuracy requried for the width of the write head element can be relaxed.

According to the embodiment, a magnetic storage medium which has a phase shift between each adjacent dot rows is combined with a shingled-write recording method. Therefore, a dot pitch in a dot row direction can be multiplied to be several times greater, depending on an amount of pitch phase shift, and the write phase margin can accordingly be increased.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording device comprising:
   a magnetic storage medium comprising magnetic dot rows with a phase shift between adjacent dot rows wherein the phase shift between adjacent dot rows is (360/n) degrees, where n is an integer not smaller than two;
   a recording head configured to cover a predetermined number of dot rows and comprising an edge located at a dot row to be recorded;
   a reproducing head configured to cover a number of dot rows equal to n and to sequentially reproduce information from dots in the n dot rows along a direction of dot rows;
   a first actuator configured to move the recording head from the dot row to an adjacent dot row after recording is performed on the dot row by the recording head; and
   a second actuator configured to move the reproducing head by n dot rows after reproduction is performed from the n dot rows by the reproducing head, and
   thereby recording information based on a shingled-write recording method.

2. The magnetic recording device of claim 1, further comprising:
a module configured to rearrange information reproduced from the dots by the reproducing head in accordance with a recording order of the dots.

3. A magnetic recording method for a magnetic storage medium comprising magnetic dot rows with a phase shift between adjacent dot rows wherein the phase shift between adjacent dot rows is (360/n) degrees, where n is an integer not smaller than two, the method comprising:
locating an edge of a recording head at a dot row to be recorded and recording information on the dot row wherein the recording head is configured to cover a predetermined number of dot rows;
locating a reproducing head at a number of dot rows equal to n and sequentially reproducing information from dots in the n dot rows along a direction of dot rows wherein the reproducing head is configured to cover a number of dot rows equal to n;
moving the recording head by one dot row and sequentially recording information on each dot row based on a shingled-write recording method; and
moving the reproducing head by n dot rows after reproduction is performed from the n dot rows by the reproducing head.

4. The magnetic recording method of claim 3, further comprising:
rearranging information reproduced from the dots by the reproducing head in accordance with a recording order of the dots.

5. A magnetic recording device comprising:
a magnetic storage medium comprising magnetic dot rows with a phase shift between adjacent dot rows wherein the phase shift between adjacent dot rows is (360/n) degrees, where n is an integer not smaller than three;
a recording head configured to cover a predetermined number of dot rows and comprising an edge located at a dot row to be recorded;
a reproducing head configured to cover a number of dot rows equal to n and to sequentially reproduce information from dots in the n dot rows along a direction of dot rows;
a first actuator configured to move the recording head from the dot row to an adjacent dot row after recording is performed on the dot row by the recording head; and
a second actuator configured to move the reproducing head by n dot rows after reproduction is performed from the n dot rows by the reproducing head, and
thereby recording information based on a shingled-write recording method.

6. The magnetic recording device of claim 5, further comprising:
a module configured to rearrange information reproduced from the dots by the reproducing head in accordance with a recording order of the dots.

7. A magnetic recording method for a magnetic storage medium comprising magnetic dot rows with a phase shift between adjacent dot rows wherein the phase shift between adjacent dot rows is (360/n) degrees, where n is an integer not smaller than three, the method comprising:
locating an edge of a recording head at a dot row to be recorded and recording information on the dot row wherein the recording head is configured to cover a predetermined number of dot rows;
locating a reproducing head at a number of dot rows equal to n and sequentially reproducing information from dots in the n dot rows along a direction of dot rows wherein the reproducing head is configured to cover a number of dot rows equal to n;
moving the recording head by one dot row and sequentially recording information on each dot row based on a shingled-write recording method; and
moving the reproducing head by n dot rows after reproduction is performed from the n dot rows by the reproducing head.

8. The magnetic recording method of claim 7, further comprising:
rearranging information reproduced from the dots by the reproducing head in accordance with a recording order of the dots.

* * * * *